2,786,865

Patented Mar. 26, 1957

2,786,865

ALPHA-OXIMINO SULFIDES AND THEIR PREPARATION

John W. Copenhaver, Short Hills, N. J., assignor to The M. W. Kellogg Company, Jersey City, N. J., a corporation of Delaware No Drawing. Application December 30, 1954,
Serial No. 478,896

9 Claims. (Cl. 260—453)

This invention relates to new compositions of matter, i. e., nitrogen and sulfur containing organic compounds. More particularly, the invention relates to alpha-oximino sulfides and the method for their preparation.

It is an object of this invention to provide a class of compounds whose structure is novel.

It is another object of the present invention to provide a method for the preparation of these compounds.

It is another object of this invention to provide a class of compounds which are useful as oil additives, antioxidants, accelerators and chemical intermediates.

Various other objects and advantages will become apparent to those skilled in the art upon reading the accompanying description and disclosure.

In accordance with this invention the alpha-oximino sulfides are prepared by the reaction of a primary aliphatic nitro compound with a mercaptan in basic media. The product formed by the reaction is represented by the formula:

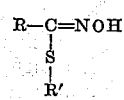

in which R is a monovalent organic radical of the group consisting of alkyl, aralkyl and aryl radicals and R' is a monovalent organic radical of the group consisting of alkyl, aralkyl and aryl radicals. These compounds are soluble in the common organic solvents, e. g., ketones, alcohols and esters, in alkalis, and are slightly soluble in water.

As indicated previously, the starting material which are used in the preparation of the alpha-oximino sulfides are the primary aliphatic nitro compounds and the mercaptans. The aliphatic nitro compounds have the formula R—CH$_2$—NO$_2$ in which R is a monovalent organic radical of the group consisting of alkyl, aralkyl and aryl radicals. R preferably does not exceed 10 carbon atoms. The presence of a CH$_2$ group adjacent to the nitro group is essential in order for the reaction to proceed. Thus, secondary and tertiary aliphatic nitro compounds and aryl compounds in which the nitro group is situated on the ring, e. g., nitrobenzene, will not react with the mercaptan under the reaction conditions described herein. Typical nitro compounds are nitroethane, nitropropane, 1-nitro-isobutane, alpha-nitromethyl benzene and beta nitroethyl benzene.

With respect to the mercaptans, any mercaptan which does not contain any reactive functional group (other than the SH group), e. g., aliphatic substituted nitro groups, iodine, bromine, ketone, aldehyde, etc., can be used. Non-reactive functional groups, such as chlorine, fluorine, aromatic substituted nitro groups, carboxyl, hydroxy, amino, etc. can be present. The mercaptans have the formula R'SH in which R' is a monovalent organic radical of the group consisting of alkyl, aralkyl and aryl radicals. R' preferably does not contain more than 10 carbon atoms. Typical mercaptans include methyl, ethyl, propyl, isopropyl, butyl, isobutyl, pentyl and hexyl mercaptans, thiophenol, para nitro thiophenol, para methyl thiophenol, para ethyl thiophenol and perchloromethyl mercaptan.

In carrying out the reaction, the nitro compound and the mercaptan are dissolved in a basic media. Any proportion of nitro compound to mercaptan can be employed. However, it is preferred to employ equimolar quantities of each of the reactants. The basic media comprises an alkaline material such as an amine, an alcoholate or an inorganic hydroxide. The alkaline material is used in a concentration of from .1 mole to 5 moles per mole of nitro compound and preferably from an equimolar ratio to a slight excess, i. e., up to about 2 moles per mole of nitro compound. The amines which are used, are the tertiary alkyl amines in which the alkyl radical contains between 1 and 6 carbon atoms. The alcoholates which are used, are the alkali and alkaline earth, preferably the alkali, metal derivatives of the lower alkyl alcohols, i. e., those which contain from 1 to 4 carbon atoms. The inorganic hydroxides which are used, are the alkali and alkaline earth hydroxides, preferably the alkali hydroxides. The reactants can be dissolved, and in the case of solid alkaline materials are preferably dissolved in an inert diluent, such as water or the alkyl alcohols. The reaction is carried out at a temperature of at least 20° C. and below the decomposition temperature of the reactants and preferably, at the reflux temperature of the reactants at atmospheric pressure. The reaction can also be carried out at pressures other than atmospheric, provided that the boiling point of the solution is above about 20° C., although no particular advantage results from the use of other than atmospheric pressures.

In order to illustrate methods by which the new compounds of this invention are prepared, the following examples are presented below. It is to be understood that these examples are provided by way of illustration and are not to be considered as unnecessarily limiting the invention.

EXAMPLE 1

*Preparation of alpha-oximinoethylphenyl sulfide in an amine media*

Under a nitrogen atmosphere, 15 g. (0.2 mole) nitroethane, 22 g. (0.2 mole) thiophenol and 55 g. (0.3 mole) tri-n-butylamine were refluxed for 21 hours. The reaction mixture was then steam distilled to remove the unreacted thiophenol, amine and nitroethane. The solid residue was dissolved in about 100 ml. of diethyl ether and extracted four times with 25 ml. portions of 2 normal sodium hydroxide solution. The alkali extracts were combined and carefully acidified with 2 normal hydrochloric acid. A light brown oil separated from the mixture and crystallized upon standing. Recrystallization of the product from dilute aqueous methanol produced 7 g. of white nacreous platelets, having a melting point of 102° C. to 104° C. Further recrystallization of the product from water yielded long white needles having a melting point of 107° C. to 108° C. The percentage composition of the product is shown in Table I and proved to correspond closely with the calculated percentage composition of C$_8$H$_9$ONS.

TABLE I.—PERCENTAGE COMPOSITION

| Elements | Found in Product | | Calculated for C$_8$H$_9$ONS |
|---|---|---|---|
| | Percent | Percent | Percent |
| Carbon | 57.40 | 57.60 | 57.46 |
| Hydrogen | 5.24 | 5.09 | 5.42 |
| Sulfur | 19.62 | 19.84 | 19.17 |
| Nitrogen | 8.59 | 8.72 | 8.38 |

EXAMPLE II

*Acetic anhydride derivative of alpha-oximinoethylphenyl sulfide*

1.5 g. of the above product and 5.0 ml. of acetic anhydride were heated to gentle reflux for one minute, allowed to stand 15 minutes, then reheated to reflux for 1 minute and allowed to cool. The excess acetic anhydride was decomposed with warm water and a white solid, having a melting point of 75° C. to 77° C. was obtained. Recrystallization from n-hexane yielded a product having a melting point of 70° to 80° C. The percentage composition of the acetyl derivative is shown in Table II and proved to correspond closely to the calculated percentage composition of $C_{10}H_{11}O_2NS$.

TABLE II.—PERCENTAGE COMPOSITION

| Elements | Found in Product | Calculated for $C_{10}H_{11}O_2NS$ |
| --- | --- | --- |
| | Percent | Percent |
| Nitrogen | 6.76 | 6.69 |
| Sulfur | 15.02 | 15.29 |

EXAMPLE III

*Preparation of alpha-oximinoethylphenyl sulfide in an alkaline media*

15 g. (0.2 mole) nitroethane was dissolved in a solution of 8.8 g. (0.22 mole) sodium hydroxide in 20 ml. of water and 80 ml. of methanol. To this solution, with stirring, was added 22 g. (0.2 mole) thiophenol. After refluxing for 15 hours, the reaction mixture was cooled and just neutralized with concentrated hydrochloric acid. The reaction mixture was then steam distilled to remove the methanol, and unreacted reagents. An oily layer separated from the mixture in the steam distillation flask. Upon standing the oil solidified. The residue, 20 g., was dissolved in 100 ml. of 2 normal sodium hydroxide, separated from the insoluble material of the reaction mixture, and acidified with concentrated hydrochloric acid to yield 12 g. of alpha-oximinoethylphenyl sulfide, melting point 102°–104° C.

EXAMPLE IV

*Preparation of alpha-oximinoethylphenyl sulfide in an alcoholate media*

12 g. (0.22 mole) sodium methylate was dissolved in 100 ml. of anhydrous methanol to which was added 15 g. (0.2 mole) of nitroethane. The solution was warmed slightly and white precipitate, the sodium salt of acinitroethane, was formed. To this mixture was added 22 g. (0.2 mole) of thiophenol. The resultant mixture was subsequently refluxed for 16 hours. Isolation of the reaction product, as in Example III, yielded 12.52 g. of alpha-oximinoethylphenyl sulfide.

EXAMPLE V

*Preparation of alpha-oximinoethylhexyl sulfide in an alcoholate media*

24 g. (0.44 mole) of sodium methylate was dissolved in 200 ml. of anhydrous methanol and 30 g. (0.40 mole) nitroethane was then added. An immediate white precipitate of the aci-nitro salt formed. 47.2 g. (0.4 mole) of n-hexyl mercaptan was then added and the resultant reaction mixture was refluxed for 25 hours. The reaction product was isolated as described in Example III to yield 22 g. of a white crystalline solid having a melting point of 70° to 72° C. Recrystallization of the product from n-hexane raised the melting point to 71.5° C. to 72.5° C. The percentage composition of the product is shown in Table III and proved to correspond closely with the calculated percentage composition of $C_8H_9ONS$.

TABLE III.—PERCENTAGE COMPOSITION

| Element | Found in Product | Calculated for $C_8H_9ONS$ |
| --- | --- | --- |
| | Percent | Percent |
| Nitrogen | 7.93 | 8.08 |
| Sulfur | 18.46 | 18.50 |

The structure of the product was experimentally established through analysis and by the hydrolysis of the products with sulfuric acid, in which acetic acid, hydroxylamine and thiophenol were identified, as described in Example VI.

EXAMPLE VI

The product obtained from Example I, was refluxed with dilute sulfuric acid. The reaction mixture was then steam distilled and the distillate extracted with ether. The ether extract from the distillate was subsequently extracted with aqueous sodium hydroxide solution. To the alkaline solution was added 2,4-dinitrochlorobenzene and the mixture was then refluxed. An insoluble oil, which solidified when triturated with methanol, separated from the mixture. Recrystallization of the product from methanol yielded lemon-yellow crystals, whose melting point of 120° C.–121° C., corresponds to the melting point of dinitrophenyl phenyl sulfide, 121° C., thus showing the presence of thiophenol in the hydrolysis mixture. The aqueous distillate remaining after the extraction with ether, was neutralized with dilute sodium hydroxide and evaporated to dryness. The residue was then heated with p-bromophenylacyl bromide in methanol, cooled and the precipitate filtered off. Recrystallization of the solid from dilute methanol yielded white nacreous plates with melting points of 84°–86°, which corresponds to the melting point of p-bromophenylacyl ester of acetic acid, 86° C. The aqueous residue remaining in the steam distillation flask was filtered, partially neutralized with dilute sodium hydroxide and evaporated to dryness. The white residue contained a reducing agent as shown by reduction of ammoniacal silver nitrate to metallic silver. These experiments, in conjunction with the elemental analysis of the original product shown in Example I and the elemental analysis of a derivative of that product, obtained by a reaction with acetic anhydride, as described in Example II, identifies the structure of the original product as being:

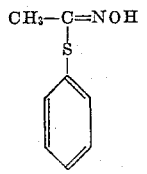

The structure of the product of Example V is:

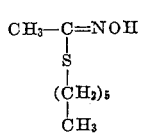

In order to demonstrate the utility of the new class of compounds of this invention, the following examples are presented below.

EXAMPLE VII

This example illustrates the use of alpha-oximino compounds as an anti-oxidant for oils. 100 parts of SAE 20 grade paraffinic base oil is admixed with approximately 1 part of alpha-oximinoethylphenyl sulfide. The oil does not exhibit a tendency to sediment or gum when it is used in an internal combustion engine.

EXAMPLE VIII

This example illustrates the use of the alpha-oximino sulfides of this invention as accelerators and anti-oxidants for diene type rubbers. The alpha-oximino sulfides because of their NOH and S groupings serve both as anti-oxidants and accelerators in diene type rubber formulations. To illustrate the use of these compounds in this respect, the following composition is prepared:

| | Parts by weight |
|---|---|
| Gr–S | 100 |
| Sulfur | 2 |
| Alpha-oximinoethylhexyl sulfide | 1 |
| Zinc oxide | 5 |
| Stearic acid | 2 |

The above composition is cured in a press at 300° F. for 60 minutes. The resulting rubber stock has good tensile strength, resilience and shows good aging characteristics.

Various alterations and modifications of the invention and its aspects may become apparent to those skilled in the art without departing from the scope of this invention.

Having thus described my invention, I claim:

1. The method for preparing alpha-oximino sulfides which comprises reacting a compound having the formula $R-CH_2-NO_2$ in which R is a monovalent hydrocarbon radical not exceeding 10 carbon atoms of the group consisting of alkyl, aralkyl and aryl radicals with a compound of the formula R'SH in which R' is a monovalent hydrocarbon radical not exceeding 10 carbon atoms of the group consisting of alkyl and aryl radicals in a basic media at a temperature above about 20° C. and below the decomposition temperature of the reactants.

2. The method of claim 1 in which the primary aliphatic nitro compound is nitro ethane.

3. The method of claim 1 in which the mercaptan is thiophenol.

4. The method of claim 1 in which the mercaptan is n-hexyl mercaptan.

5. The method for preparing alpha-oximinoethylphenyl sulfide which comprises refluxing thiophenol with nitroethane in a basic media.

6. The method of claim 5 in which the basic media is tri-n-butylamine.

7. The method of claim 5 in which the basic media is a solution of sodium methylate in methanol.

8. The method of claim 5 in which the basic media is a solution of sodium hydroxide in water.

9. The method for preparing alpha-oximinoethylhexyl sulfide which comprises refluxing nitroethane with n-hexyl mercaptan in a basic media.

References Cited in the file of this patent

Houben et al.: "Ber. deut. Chem.," vol. 69 (1936), pp. 2354–59.

Chem. Abstracts, vol. 4 (1910), p. 1738.

Cambi: "Gazz. Chim. Ital.," vol. 41 (I), (1911), p. 170.